US010895518B2

(12) United States Patent
Cama et al.

(10) Patent No.: US 10,895,518 B2
(45) Date of Patent: Jan. 19, 2021

(54) AIR QUALITY MONITORING, ANALYSIS AND REPORTING SYSTEM

(71) Applicant: INTERNATIONAL BUSINESS MACHINES CORPORATION, Armonk, NY (US)

(72) Inventors: Karl J. Cama, Southlake, TX (US); Abdolreza Salahshour, Raleigh, NC (US)

(73) Assignee: International Business Machines Corporation, Armonk, NY, Armonk, NY (US)

( * ) Notice: Subject to any disclaimer, the term of this patent is extended or adjusted under 35 U.S.C. 154(b) by 1089 days.

(21) Appl. No.: 15/166,490

(22) Filed: May 27, 2016

(65) Prior Publication Data

US 2017/0341002 A1    Nov. 30, 2017

(51) Int. Cl.
*G01N 1/22* (2006.01)
*G01N 1/28* (2006.01)

(52) U.S. Cl.
CPC ......... *G01N 1/2205* (2013.01); *G01N 1/2273* (2013.01); *G01N 2001/282* (2013.01)

(58) Field of Classification Search
None
See application file for complete search history.

(56) References Cited

U.S. PATENT DOCUMENTS

| | | | |
|---|---|---|---|
| 6,687,640 B1 * | 2/2004 | Gelbard | G01N 33/0031 702/122 |
| 2002/0124664 A1 * | 9/2002 | Call | B01D 21/2455 73/863.22 |
| 2004/0166679 A1 * | 8/2004 | Kishkovich | B01D 53/22 438/689 |
| 2008/0304752 A1 * | 12/2008 | Matteoni | G01N 1/2214 382/209 |
| 2014/0183256 A1 * | 7/2014 | Calio | G01N 1/2208 235/375 |
| 2017/0341002 A1 * | 11/2017 | Cama | G01N 1/2273 |
| 2018/0266933 A1 * | 9/2018 | Tamraz | G01N 1/2273 |

FOREIGN PATENT DOCUMENTS

CN         202855046         4/2013

* cited by examiner

*Primary Examiner* — Christopher P Jones
*Assistant Examiner* — Brit E. Anbacht
(74) *Attorney, Agent, or Firm* — Schmeiser, Olsen & Watts, LLP; Aaron Pontikos

(57) ABSTRACT

Tools, methods and systems for filtering air, identifying contaminants in the air being filtered, collectivizing the contaminant data from a network of filtering systems to identify the source of the contaminant, allowing for real-time mapping of the flow of contaminants in the air and predictive location mapping. Filtration systems receive, analyze, identify, track and report the presence of contaminants in the air using one or more computing systems, or specialized air filtration systems which may be either a self-contained computing systems, connected to a computing system or connected to a computing network. Messaging services provide updates, alerts and reports regarding the presence of the contaminant to the general public and/or selective alerts to medically sensitive or endangered individuals whose medical information indicates the contaminant is harmful or dangerous to particular individuals present in the surrounding area.

9 Claims, 7 Drawing Sheets

AIR QUALITY MONITORING, ANALYSIS AND REPORTING SYSTEM

TECHNICAL FIELD

The present disclosure relates generally to air filtration systems and methods for identifying, tracking, monitoring and reporting contaminants collected by air filtration systems.

BACKGROUND

Air pollution, bacteria, solvents and other chemicals in the air can pose threats to the health of humans and other living organisms on the planet. The threats of pollution, contaminants and other particulates can affect respiration and in some instances be fatal, specifically in situations involving young children and the elderly. Currently, the implementation of air filtration collects contaminants and particulates that enter the filtration system. However, air filtration systems collecting contaminants, only act as a removal system, separating the contaminant from the air.

SUMMARY

A first embodiment of the present disclosure provides a method for analyzing an airborne contaminant comprising the steps of receiving, by an air filtration system, a contaminant; collecting, by the air filtration system, via a filtration sensor of the air filtration system, identifying data of the contaminant; analyzing, by the air filtration system, the identifying data of the contaminant; concluding, by the air filtration system, an identity of the contaminant as a function of the analyzing step; and reporting, by the air filtration system, the identity of the contaminant.

A second embodiment of the present disclosure provides a computer system, comprising a processor; a memory device coupled to the processor; an air filter having a filtration sensor coupled to the processor and a computer readable storage device coupled to the processor, wherein the storage device contains program code executable by the processor via the memory device to implement a method for analyzing an airborne contaminant comprising the steps of: receiving, by the processor, a signal from the filtration sensor indicating receipt of a contaminant by the air filter; further receiving, by the processor, identifying data of the contaminant from the filtration sensor; analyzing, by the processor, the identifying data of the contaminant; concluding, by the processor, an identity of the contaminant as a function of the analyzing step; and reporting, by the processor, the identity of the contaminant.

A third embodiment of the present disclosure provides an air filtration system comprising: a filter housing; an air filter stored within the air filter housing; a data bus line printed onto the filter housing; and a filtration sensor connected to the air filter and the data bus line.

DETAILED DESCRIPTION

Overview

Figure 1A:
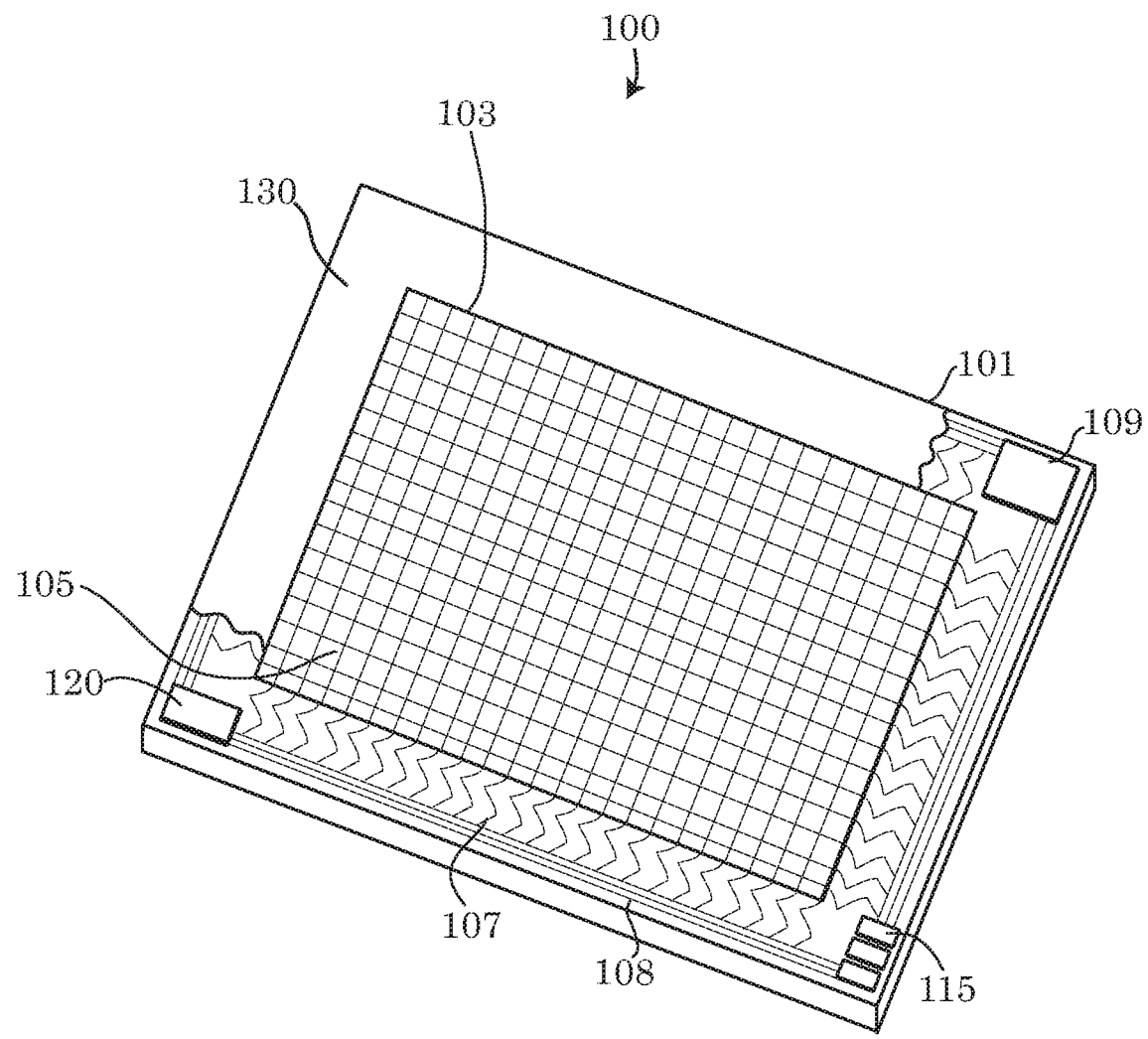
FIG. 1a depicts a partially cut-away, isometric view of an embodiment of an air filtration system.

Embodiments of the present disclosure recognize that available air filtration technologies do not identify airborne contaminants (hereinafter "contaminants") or particulates that are trapped by an air filter. Nor do currently available filtration systems automatically alert users of dangerous or harmful contaminants collected by the filter. Instead, identification of the trapped contaminants, replacement of filters and alerting individuals of the potentially dangerous environments relies on manual inspection and/or notification by users or service professionals maintaining the air filtration systems. The process of inspecting and maintaining the filtration systems may only occur at intermittent periods of time as recommended by the filter manufacturer. Embodiments of the present disclosure provide for tools, methods and systems for filtering air, which may identify contaminants in the air being filtered, collectivizing the identifying data of the contaminants from a network of filtration systems to identify the source of the contaminant, and mapping the direction of contaminant movement from the data collected from each filtration system in the network. The embodiments of the present disclosure may automate the identification of contaminants, identification of the contaminant source, mapping the areas affected by the contaminants and predict the trending patterns of contaminant movement.

Moreover, the tools, methods and systems provided in this disclosure may be useful for identifying, tracking and reporting the presence of contaminants which may be harmful to the individuals present in the surrounding area where the contaminant is identified. The tools, methods and systems may provide individuals and residents of the surrounding area with useful information for avoiding the contaminant, which may be harmful, identify symptoms of associated exposure to the contaminant and alert individuals with the symptoms of exposure to seek medical attention. The tools, methods and systems described by this disclosure may pinpoint sources of the contaminant's origin, allowing for experts or professionals to contain and/or remove the contaminant source in a quick and effective manner, before the general public becomes exposed to the contaminant, as well as assist medical professionals in making diagnoses based on trends in local contaminants exposed to the nearby public.

The embodiments of the air filtration tools, methods and filtration systems may receive, analyze, identify, track and report the presence of contaminants in the air using one or specialized air filtration systems, which may be a self-contained computing system, connected to a computing system and/or a network of computing systems. The air filtration systems may include a filter housing storing an air filter, which may be coated with one or more contaminant identifying chemicals. The air filter may be connected to a data bus line and a filtration sensor capable of detecting reactions, chemical changes or physical changes producing measurable data and transferring the measured data from the air filter to the data bus line. The contaminant identifying data received from the filtration sensors may be subjected to a computer analytics model and analyzed using one or more algorithms by the air filtration system or a computing system connected to the air filtration system, in order to identify the type of contaminant being received by the air filter.

In some embodiments, the contaminant identifying data may be compared with a local knowledge base or a network accessible knowledge base having a database or other searchable data set of contaminant information. Using the information stored by the knowledge bases, the air filtration system and/or computer system connected to the air filtration system may positively identify the type of contaminant being collected.

Furthermore, upon positive identification of the collected contaminant, each of the air filtration systems in a network of systems may transmit the identifying data and conclusions about the contaminant's identity, along with location data of the air filtration system, to a centralized computing system. The centralized computing system may aggregate contaminant data from a plurality of air filtration systems and correlate the location data and collection points of the contaminant to generate a real time mapping of the contaminant's direction of flow, source location, the affected area of the contaminant, and predict future contaminant locations. Embodiments of the air filtration system or the centralized computer system may alert residents or other individuals of the surrounding area about the presence of the contaminant, the possible dangers of the contaminant, symptoms that may be experienced upon exposure to the contaminant and any other useful information that may be important for maintaining safety in the contaminated area.

In some embodiments, the air filtration system and computing systems may pinpoint the residents or other individuals of the contaminated area that are high risk of exposure or experiencing adverse effects of the contaminant by searching local and network accessible data sources that may contain medical information about the residents or individuals in the areas affected by or adjacent to the contaminated air. The systems and tools may employ methods for alerting these individuals who are at risk of exposure and prone to experiencing the adverse side effect according to the individuals' medical data.

System for Filtering Air and Identifying Contaminants

Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure. A more complete understanding of the present embodiments and advantages thereof may be acquired by referring to the following description taken in conjunction with the accompanying drawings, in which like reference numbers indicate like features.

As a preface to the detailed description, it should be noted that, as used in this specification and the appended claims, the singular forms "a", "an" and "the" include plural referents, unless the context clearly dictates otherwise.

Referring to the drawings, FIG. 1a depicts an embodiment of an air filtration system 100. Embodiments of the air filtration system 100 may include a housing 101. The housing 101 may be defined as a rigid casing that may support and/or enclose each of the pieces or components that comprise the air filtration system 100. The housing 101 may be constructed out of any rigid or semi-rigid material known by those skilled in the art. For example, the material constructing the housing 101 may include plastics such as plastic resins, paper, metals, cardboard and/or hardened rubber. In some embodiments the housing may have a top surface layer 130 which may encase or shield the components housed by the filter housing 101.

Embodiments of the air filtration system 100 may further include an air filter 103 which may be placed within the housing 101 of the air filtration system 100. The top surface 130 of the housing 101 may encircle the perimeter of the air filter 103, as shown by the partial cutaway of FIG. 1a. The air filter 103 may be permanently affixed to the housing 101 in some embodiments. In other embodiments, the air filter 103 may be removable and/or replaceable. For example, the air filter 103 may be inserted or slid into a slot or groove and locked down into position within the housing 101. In other embodiments, the housing 101 may separate into one or more pieces wherein upon separation, the previous air filter 103 may be released from the housing 101 and replacement air filter 103 may be placed between the separated sections of the housing 101. The separated sections of the housing 101 may be fitted back together and locked back into place with the replacement air filter 103 affixed there between. In alternative embodiments, the air filter may be attached to a mechanical device that automatically feeds new sheets of the air filter 103 into the housing 101. For example, an air filter may be rolled or into a tube-like device. As an existing air filter 103 become contaminated with contaminants or other particulates, a new section of the air filter may be fed into the housing 101 and exposed to the incoming contaminants.

Embodiments of the air filter 103 may be any type of porous membrane known by a person skilled in the art allowing for air to flow through the membrane while filtering particulate matter and contaminants from the air. A contaminant may refer to any foreign particle or particulate matter that may not normally be found as part of a mixture pure air. Examples of contaminants may include may include dust, pollen, algae, bacteria, viruses, mold, mildew, dander, solvents, foreign molecules, radioactive particles, etc. In some embodiments, the air filter 103 may be a fiberglass filter which may be reinforced with a plastic or metal grating to reinforce the fiberglass filter from collapsing. In alternative embodiments, the fiberglass may be replaced with a polyester or pleated filter, which may be suitable for filtering smaller particulates or for increasing the resistance of the air flow through the air filter 103. In yet another embodiment, the air filter 103 may be a high efficiency particulate arrestance (HEPA) filter, which may be configured to meet efficiency standards set by the US Department of Energy, including the removal of at least 99.7% of particles having a particle size of at least 0.3 μm.

In some embodiments of the air filtration system 100, the air filter 103 may be configured into a grid pattern 105, which may be useful for increasing the capture and receipt of contaminant particles. Additionally, the grid pattern 105 may be useful for accurately identifying the positional placement of the contaminant particle once it is captured by the air filter 103. In some embodiments, sections of the grid pattern 105 may be coated with one or more chemical agents capable of identifying the contaminants or characteristics of the contaminants upon contacting the section of the coated grid pattern 105. These chemical agents used for identifying the contaminants or characteristics of the contaminants entering the air filter 103 may be referred to as a "contaminant identifying agent." Coating sections of the grid 105 with different contaminant identifying agents may be beneficial because certain contaminants may only react with a particular contaminant identifying agent. By coating the grid 105 with different contaminant identifying agents, when a reaction does occur between the contaminant and the contaminant identifying agent, the specific agent generating the reaction may be identified which may assist with immediately narrowing the types of contaminants that the contaminant may be.

Figure 1B:
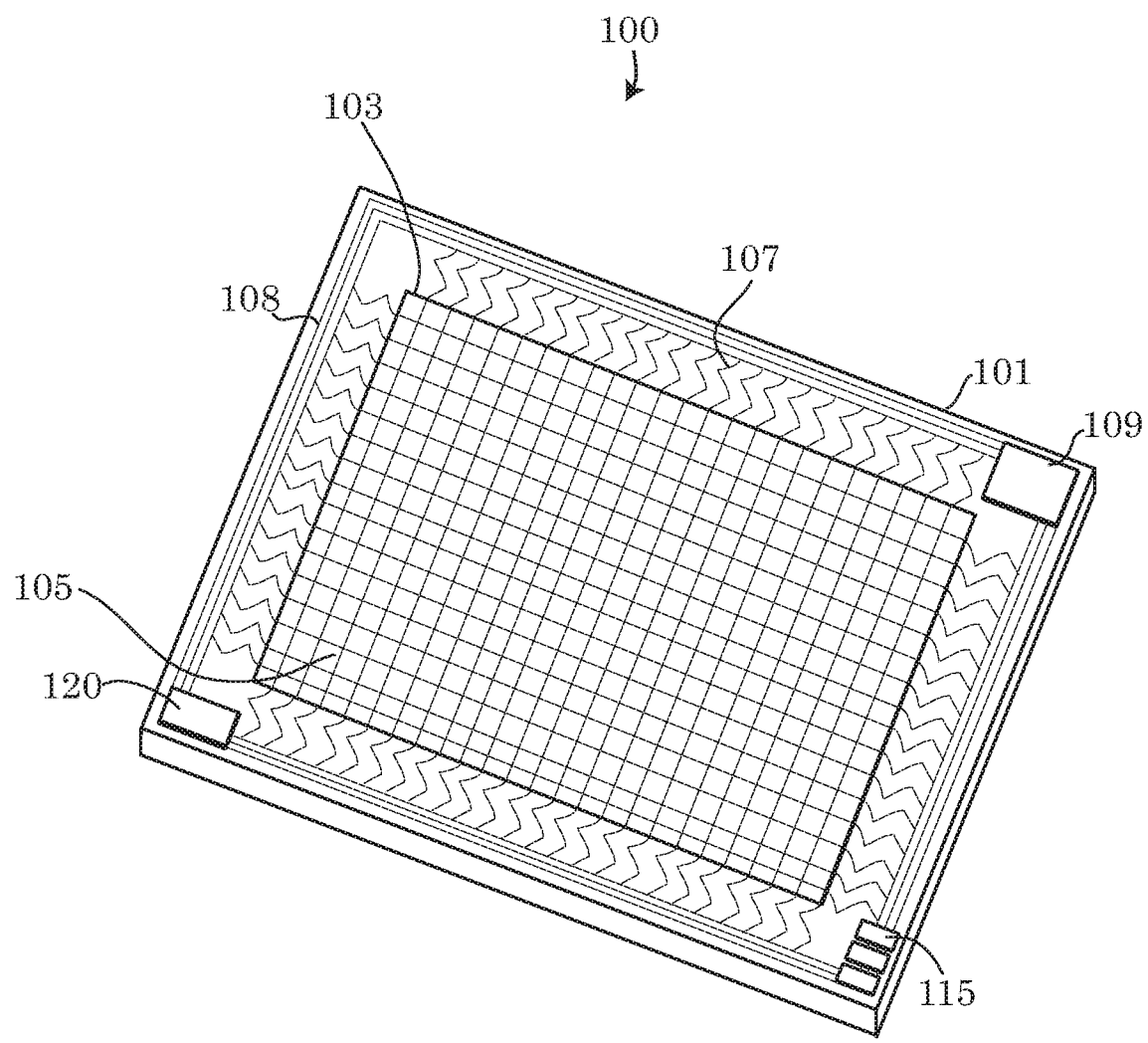
FIG. 1b depicts an isometric view of the embodiment of the air filtration system of FIG. 1a having a top layer of a filter housing removed.

Embodiments of the air filtration system 100 may use a combination of separation and detection technologies to make use of the contaminant identifying agent in combination with the air filter 103 and a filtration sensor 107 to distinguish and identify contaminants, making the contaminant detectable by the filtration sensor 107. Distinguishing attributes provided by the contaminant identifying agent upon contacting the contaminant, may include reactions such as color changes, measurements of the mass-to-charge ratio of the contaminant, absorption and scattering of electromagnetic energy such as in the infrared to microwave region of the electromagnetic spectrum, reactions that cause unique emissions such as chemiluminescence, physical separation, changes in contaminant polarity, electrochemical interaction and/or enzymatic reactions. Embodiments of the filtration sensor 107 may be a device that produces a measurable response to the changes caused by the reaction between the contaminant identifying agent and the contaminant, for example a change in temperature, thermal conductivity, change in appearance (e.g. color change) or change in chemical concentration.

For instance, in the exemplary embodiment of an air filtration system 100, an air filter 103 may be installed in the intake system of a home or building. The air filter 103 of the air filtration system 100 may have a grid pattern 105 that may be coated with a contaminant identifying agent. As air enters the building's intake and flows through the air filter 103, the moisture of the air may prime the contaminant identifying agent on the grid 105. The contact between the contaminant and the contaminant identifying agent may trigger a reaction that may produce an electric charge which may be measured and received by the filtration sensor 107 connected to the filter's grid pattern 105. In some embodiments, the electric signal sent as a product of the reaction between the contaminant and the contaminant identifying agent may be mapped to the specific chemical on the grid 105 at a particular section of the grid 105. In some embodiments, the location on the grid 105 where the reaction occurred may be identifiably tagged and may further be deduplicated as data which may be received and transmitted by a data bus line 108 connected to the filtration sensor 107.

Certain filtration sensor 107 mechanisms and identifying agents may be more useful for a particular type contaminant, whereas in other instances other filtration sensor 107 mechanisms may be more beneficial and properly sensitive enough to identify the contaminant. Examples of technologies that may use a combination of contaminant identifying agents and filtration sensors 107 to identify the identity of the contaminant may include technologies containing color change chemistry, ion mobility spectrometry, infrared absorption spectroscopy, differential optical absorption spectrometry, aerosol mass spectrometry, Raman spectroscopy, non-dispersive infrared spectroscopy, phosphorus chemiluminescence, light detection and ranging systems (lidar), surface acoustic wave (SAW) technology, electrochemical sensor technology, photoionization technology, photoacoustic infrared spectroscopy, millimeter and submillimeter wave detection, enzymatic antibody immunoassays, aerosol mass spectrometry, and/or one or more chemical agent detection papers known in the art such as M8, M9, M256A1, M256A2, M18A2, M21, M22, M90, ICAD and CAPDS.

In the embodiments of the contaminant measuring mechanisms listed above, different contaminant identifying agents may be used in combination with the air filter 103, grid 105 and filtration sensors 107, to achieve different reactions and results depending on the contaminants being identified. The contaminant identifying agent, along with the filtration sensors 107 may collect identifying data about the contaminant that may allow for the filtration system 100 to deduce the identity of the contaminant captured by the air filter 103. For instance, as a result of the reaction between the contaminant identifying agent and the contaminant, the filtration sensor 107 may be able to measure identifying data such as the density of the contaminant, the duration the contaminant was detected for, frequency of detecting the contaminant, mass of the contaminant, charge of the contaminant, mass-charge ratio of the contaminant, photoluminescence of the contaminant, concentration, wavelength of infrared absorption, infrared light absorption, wavelengths of scattered light, wavelengths of the vibrational structure of the contaminant, optical emission of contaminant once excited by the contaminant identifying agent, solid state acoustic waves given off by the contaminant, changes in polarity and changes in electrical potential of the contaminant.

Embodiments of the air filtration system 100 may include a data bus line 108 which may be printed, etched, or provided on the interior or exterior surface of the filter housing 101. The data bus line 108 may refer to a group of signal lines capable of transmitting data in parallel from one element or component of the air filtration system 100 to another. As shown in FIG. 1*b*, data bus line 108 may be connected to each of the filtration sensors 107, and the data bus line 108 may receive the identifying data of the filtration sensors 107. Embodiments of the data bus line 108 receiving the identifying data about the contaminant from the filtration sensors 107 may further transmit the identifying data from the filtration sensors 107 to one or more additional components of the air filtrations systems 100.

In some embodiments, the filtration system 100 may be considered to be defined as a computer system in accordance with the computer system of FIG. 5 of this disclosure. For example, in some embodiments, the air filtration system 100 may further comprise an onboard chipset, microcontroller or processor 109, a memory device 115 and an input/output (I/O) interface 120, each of which may be connected to the data bus line 108 and may receive the identifying data transmitted from the filtration sensor 107. Embodiments of the memory device 115 may store identifying data collected by the filtration sensors 107 as well as program code loaded in the memory device 115 comprising instructions for filtering the air and identifying contaminants in the air being filtered consistent with the filtering module 203 of computer system 201 described below, implementing the filtering methods of FIG. 4.

Referring to the drawings, FIG. 2*a* depicts a block diagram of an embodiment of an air filtration system 200, which may be described a self-contained air filtration system 100 having an onboard processor 109, memory 115 and I/O interface 120 built into the housing 101 of the filtration system 100. Alternatively, the embodiment of the air filtration system 200 may also describe an embodiment of an air filtration system 100, whereby the data bus lines 108 may connect to a separate computing system 201, separate from the housing 101 of the filtration system 100 depicted in FIG. 1*b*, whereby computer system 201 may have its own processor 109 and memory device 115 connecting to the data bus lines 108 of the printed on the filtration housing 101 via an I/O interface 120.

Embodiment of air filtration system 200 may comprise one or more air filtration sensors 107*a*, 107*b* . . . 107*n* (referred to collectively as "filtration sensors 107") connected via an I/O interface 120 to computer system 201. The number of filtration sensors 107 connecting to computer system 201 via data bus lines 108*a*, 108*b* . . . 108*n* (referred to collectively as "data bus lines 108) may vary from embodiment to embodiment, depending on the number of filtration sensors 107 present in the air filtration system 200 as well as the number of air filters 103 connected to the sensors 107. The reference numbers with sub-letters and ellipses, for example describing filtration sensors as 107*a*, 107*b* . . . 107*n* or the data bus lines as 108*a*, 108*b* . . . 108*n*, may signify that the embodiments are not limited only to the amount of elements actually shown in the drawings, but rather, the ellipses between the letters and the $n^{th}$ element indicate a variable number of similar elements of a similar type. For instance with regard to the sensors 107 depicted in FIG. 2*a*, any number of a plurality of filtration sensors 107 may be present including filtration sensor 107*a*, filtration sensor 107*b* and a plurality of additional filtration sensors up to the $n^{th}$ number of filtration sensors 107*n*, wherein the variable "n" may represent the last element in a sequence of similar elements shown in the drawing.

Figure 2A:
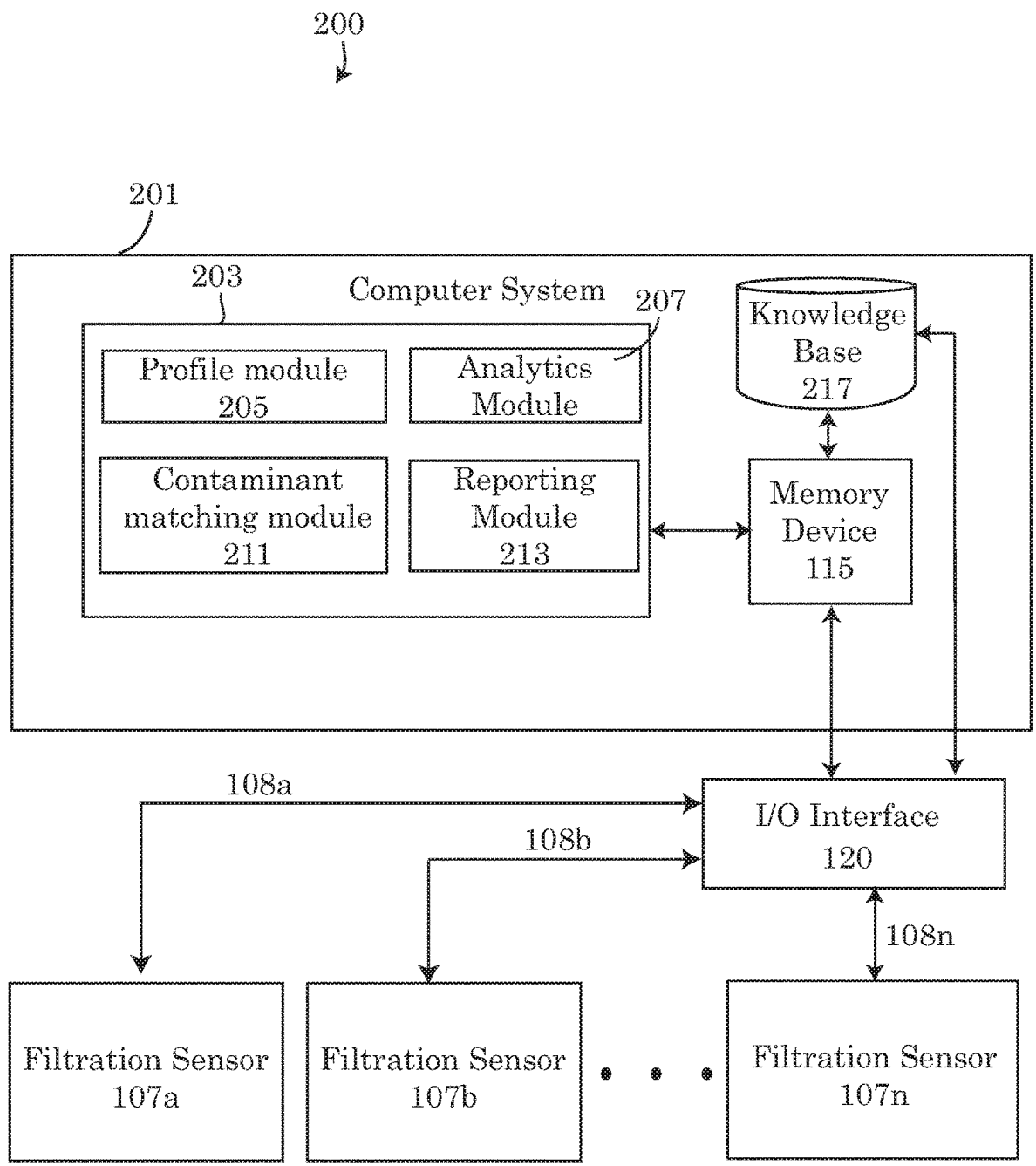
FIG. 2a depicts a block diagram of an embodiment of the air filtration system.

As show in FIG. 2*a*, each of the filtration sensors 107 may transmit the contaminant identifying data received from the sensor 107 by connecting to computer 201 via the data bus lines 108 to an I/O interface 120. An I/O interface 120 may refer to any communication process performed between the computer system 201 and the environment outside of the computer system, for example the filtration sensors 107. Input may refer to the signals or instructions sent to the computer, for example the identifying data collected by the filtration sensors 107, while output may refer to the signals sent out from the computer system 201 to the filtration sensors 107 or in some embodiments to the onboard processor 109 or memory 115 of the filter housing 101.

Embodiments of the computing system 201 may receive the contaminant identifying data from one or more filtration sensors 107 which may be positioned on one or more different filter housings 101, each of which may contain one or more different air filters 103 collecting contaminants from one or more different locations. Embodiments of the computer system 201 connected to the I/O interface 120 may be equipped with a memory device 115 which may store the contaminant identifying data generated and transmitted as data by the filtration sensors 107.

Embodiments of computer system 201 may include a filtration module 203. A "module" may refer to a hardware based module, software based module or a module may be a combination of hardware and software. Embodiments of hardware based modules may include self-contained components such as chipsets, specialized circuitry and one or more memory devices, while a software-based module may be part of a program code or linked to the program code containing specific programmed instructions, which may be loaded in the memory device 115 of the computer system 201. A module (whether hardware, software, or a combination thereof) may be designed to implement or execute one or more particular functions or routines. Each of the air filtration systems 100, 200 may include filtration module 203.

Embodiments of the filtration module 203 may include one or more components of hardware and/or software program code for receiving, analyzing, interpreting and reporting data based on the contaminant identifying data collected by the filtration sensors 107. Embodiments of the filtration module 203 may include a profile module 205, analytics module 207, contaminant matching module 211 and/or a reporting module 213.

Embodiments of the profile module 205 may create, store and organize user profiles and may include create and store data received by the computer system 201, by associating the data with one or more fields. The profile module 205 may create and store profiles for users of the computing system 201 and/or may register identifying information about users of the computer system 201 as well as residents and/or individuals who may reside within a particular proximity to the air filtration system 200. For instance, residence within a home or business equipped with the air filtration system 200 or near an air filtration system 200, may provide personalized information such as a name, age, birthdate, general health or medical information, known allergies, telephone number, email address or approve access to a communications application for receiving alerts/messages from the reporting module 213. By registering a resident or user with the air filtration system 200, the air filtration system 200 may contact each of the registered users, residents, physicians or nearby hospitals and clinics with alerts or information regarding contaminants collected by the air filtration system, including potential symptoms that may suggest exposure to the contaminant and/or general safety tips for avoiding the harmful effects of a contaminant.

The analytics module 207 may refer to configurations of hardware, software program code, or combinations of hardware and software programs, capable of receiving data from one or more data sources and applying one or more data models to discover, identify, interpret and communicate patterns in the data. The analytics module 207 may rely on applications of statistics, computer programming, quantitative and qualitative analysis of the data collected and received by the analytics module in order to discover, interpret and report patterns in the data. In some embodiments, the analytics module 207 may receive contaminant identifying information from the filtration sensors 107 and compare the contaminant identifying data with a locally stored knowledge base 217 or network accessible knowledge base 317.

For example, knowledge bases 217, 317 may include a repository of characteristics and publically available or subscription based indexes cataloging identifying features of known contaminants and particulates that may be collected by the air filtration system 200. The knowledge bases 217, 317 may provide information about known contaminants such as the density, electric potential, size, mass to charge ratio, observable color changes when applying particular color change chemistry, changes in polarity, velocity of movement upon impact in the air filter 103, volume of the contaminant, and other contaminant identifying data that may be collected by the filtration sensors 107 and transmitted to the analytics module 207. The analytics module 207 may draw specific conclusions about the type of contaminant collected by the air filter 103 based on similarities in the properties of the collected contaminants, compared with the properties of known contaminant data accessible to the analytics module 207 and stored by the knowledge bases 217, 317.

In some embodiments, the air filtration system 200 may include a contaminant matching module 211 which may be a separate module from the analytics engine 207 or the contaminant matching module may be integrated as part of the analytics module. Embodiments of the contaminant matching module 211 may contain a customizable set of rules or algorithms stored as part of a rules engine, which may be queried by the analytics module 207 when comparing the contaminant identifying data with data available from external sources such as the knowledge bases 217, 317. For example, in some embodiments, the contaminant matching module 211 may retrieve data from an external knowledge base 217, 317 such as the Center for Disease Control (CDC), Federal Drug Administration (FDA), universities, government run or private facilities that study chemical and/or biological agents or impurities that may be the contaminant collected by the air filtration system.

In alternative embodiments, the contaminant matching module 211 may receive location data from the air filters 103, location data from nearby residents, users and other individuals registered to the profile module 205 and cross reference the location data of residence or users with the resident/user's medical information or medical history with disease trends at remotely accessible medical facilities. By cross referencing available data from data sources, local medical systems and current trends in a particular location with the contaminant identifying data collected by the filtration sensors 107, the contaminant matching module 211 can calculate a probability, via the analytics module 207 that the contaminant collected by the air filter 103 matches a known contaminant in a particular location.

Embodiments of the reporting module 213 may be hardware, software programs loaded in memory device 215 or a combination of hardware components and software programs which may provide residents, users and remotely accessible computer systems with information and analytical results of the analytics module 207 and/or the contaminant matching module 211. The reporting module 213 may output to the computer system 201 and/or computer systems of residents and users the identity of the contaminant collected by the air filter 103, messages or alerts indicating medical symptoms or exposure to contaminants, safety tips, precautions and trends in the area regarding the contaminants. In addition, the reporting module 213 may alert government agencies, research facilities and medical facilities such as individual doctors' offices and hospitals of the contaminants and/or potential epidemic or pandemic that may arise if the contaminant continues to spread.

In some embodiments, the reporting module 213 may generate and output reports mapping the locations of contaminant collection using the location of air filters 103 collecting the contaminant in conjunction with the location data of each air filtration system 200 having collected and identified the particular contaminant. Embodiments of the reporting module 213 may provide a real time or near real time, interactive map that may update as additional contaminant collection and identification occurs at a plurality of air filtrations systems being reported to the reporting module 213. The reporting module 213, in concert with the analytics module may use the reporting data and mapping features of the reporting module 213 to predict and identify the location source of the contaminant, the rate and direction of movement of the contaminant, and further predict areas that may be further affected by the contaminant if preventative measures are not implemented. In some embodiments, the reporting module 213 may predictively anticipate the effects of one or more preventative or mitigating measures to limit or reduce the spread of the contaminant. The reporting module 213 may generate a map of one or more scenarios based on the preventative or mitigation steps taken and via the analytics module 207 predict the effects and impact of the measures taken.

Figure 2B:
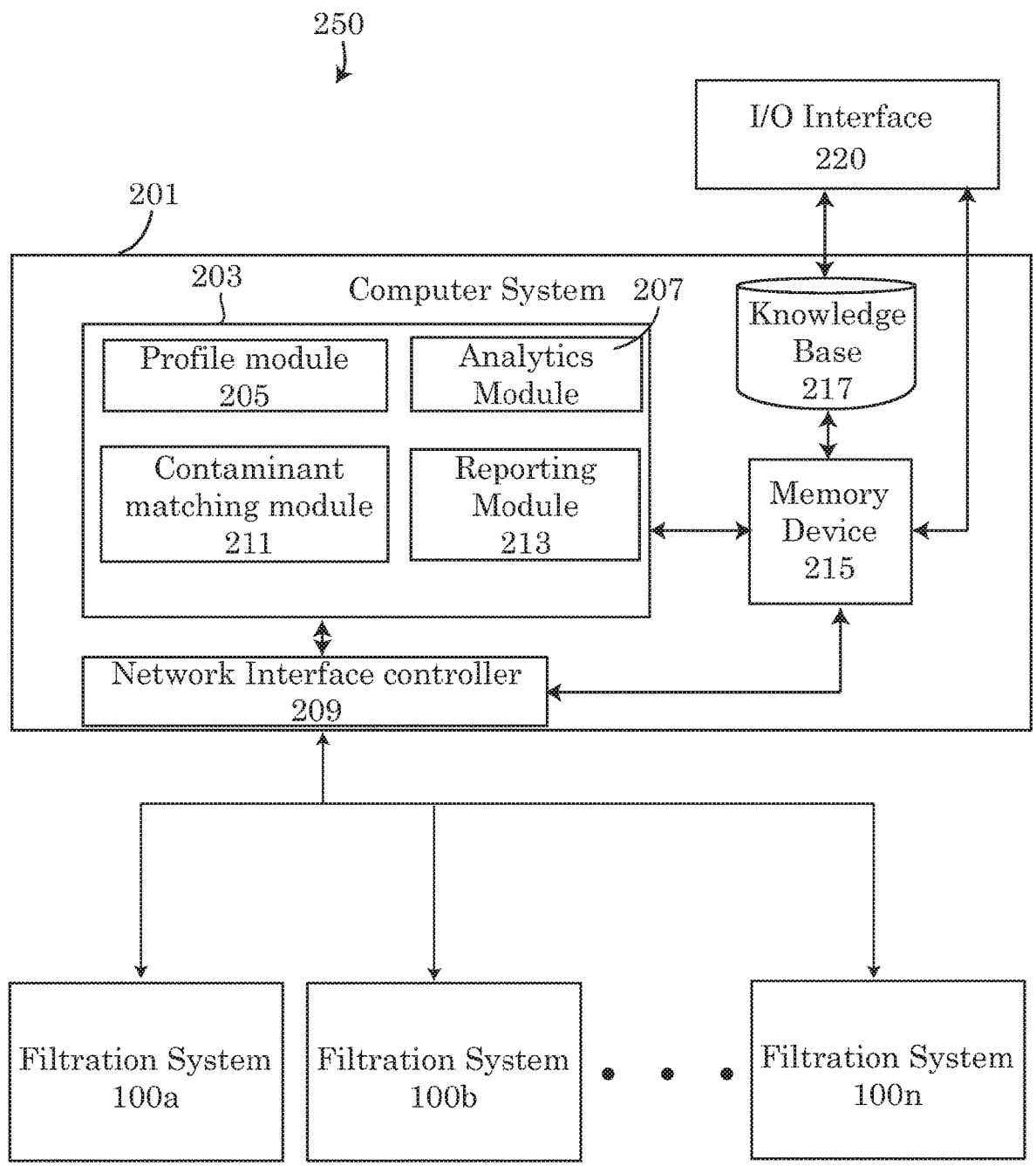
FIG. 2b depicts a block diagram of an alternative embodiment of an air filtration system.

Referring to FIG. 2b, depicting an embodiment of an air filtration system 250 remotely connected to a plurality of filtration systems 100a, 100b . . . 100n (referred to collectively as air filtration systems 100) such as the system depicted in FIG. 1, may be remotely via a network interface controller 209 instead of a direct link via data bus line 108 shown in FIG. 2a. The network interface controller 209 may also be referred to as a network interface card, network adapter, or physical network interface. The network interface controller 209 may be a physical electronic circuitry or a virtual controller that provides a base for a full network protocol stack, allowing communication between groups of computer systems sharing a network, for example a local area network (LAN) or a wide area network (WAN). Both the filtration systems 100 and the network interface controller 209 may communicate with one another using a physical layer or virtual layer and a data link layer such as Ethernet, Fiber, Wi-Fi or a token ring. In some embodiments, each of the filtration systems 100 may be wired directly to the network interface controller 209, whereas in alternative embodiments the filtration systems may transmit data wirelessly using a wireless technology such as Wi-Fi, Bluetooth, Bluetooth low energy, or RF infrared to wirelessly communicate contaminant identifying data collected from the filtration sensors 107 of the filtration systems 100 to the computer system 201.

Figure 3:
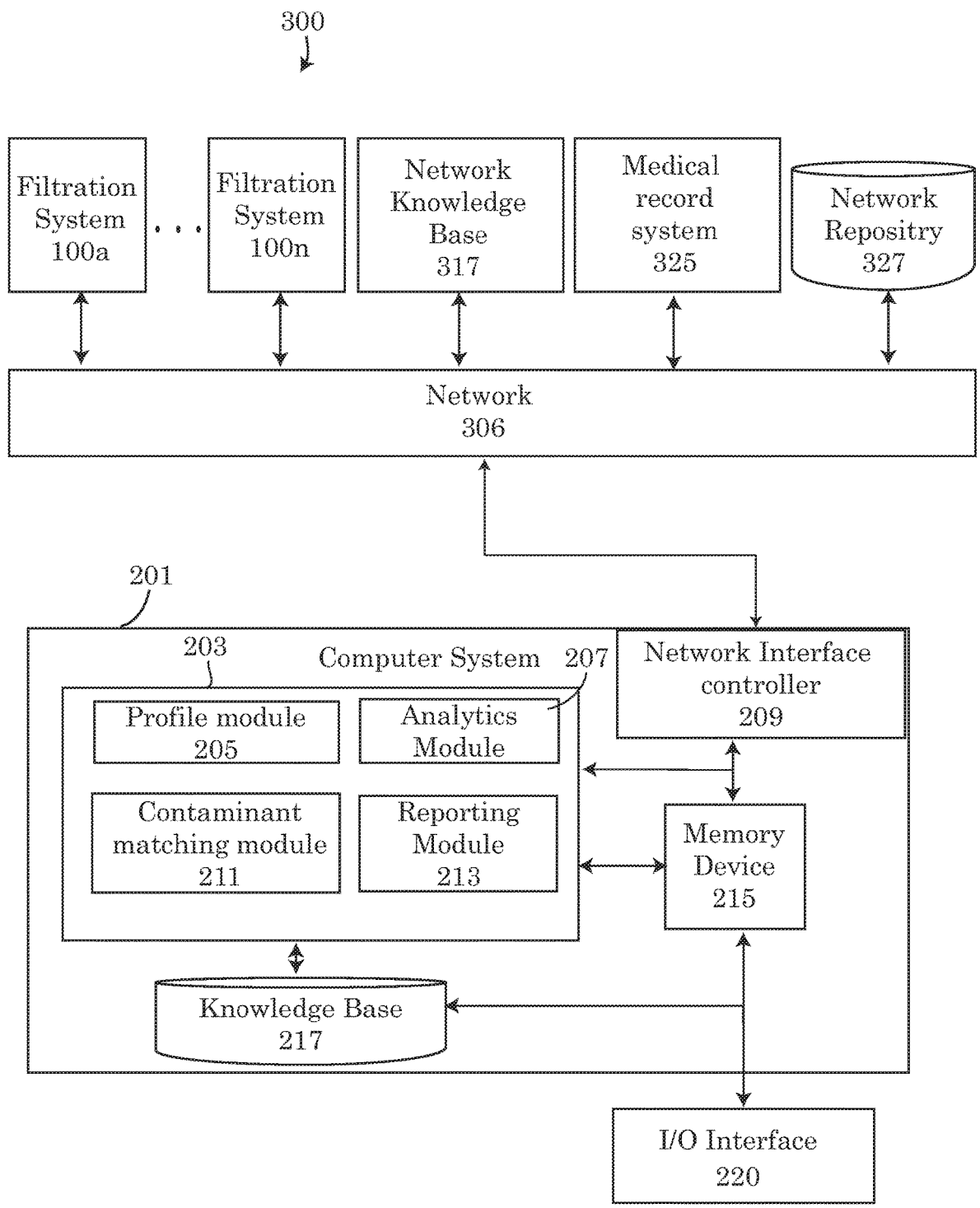
FIG. 3 depicts a block diagram of an embodiment of a network enabled air filtration system.

In an alternative embodiment of FIG. 3, the computer system 201 and filtration systems 100 may each be connected to a network 306. A network 307 may refer to a group of two or more computer systems linked together. Network 307 may be any type of computer network known by individuals skilled in the art. Examples of computer networks 307 may include a LAN, WAN, campus area networks (CAN), home area networks (HAN), metropolitan area networks (MAN), an enterprise network, cloud computing network (either physical or virtual) a cellular communication network such as GSM or CDMA network or a mobile communications data network. The architecture of the computer network 306 may be a peer to peer network in some embodiments, wherein in other embodiments, the network 307 may be organized as a client/server architecture.

In some embodiments, the network may further comprise, in addition to the computer systems 201 and filtration systems 100, a connection to one or more network accessible knowledge bases 317, medical record systems 325 containing medical records of one or more residents, users or individuals within a proximity to the networked filtration system 300, network repositories 327 or other systems connected to the network 306 that may be considered nodes of the network 306. In some embodiments, where the computing systems 201, filtration systems 100 or network repositories 327 allocate resources to be used by the other nodes of the network 306, the computer systems 201, network repository 327 and filtration systems 100 may be referred to as servers.

The network repository 327 may be a data collection area on the network 306 which may back up and save all the data transmitted back and forth between the nodes of the network 306. For example, the network repository may be a data center saving and cataloging contaminant identifying data sent by each of the filtration systems 100, the identification of the contaminants as identified by the filtration module 203 including each report and mapping outputted by the report module 213. Embodiments of the network repository may back up and store data relating to the medical records of users, individuals and residents within a proximity to the networked filtration system 300 stored by the medical record system 325 as well any network accessible knowledge base 317 or local knowledge base 217. In some embodiments, a data collection center housing the network repository 327 may include a an analytic module 207 capable of analyzing each piece of data being stored by the network repository 327 allowing for the data collection center to draw its own conclusions about contaminants, reports, mappings and predictions in addition to or separately from the reporting module 213 of computer system 201. In some embodiments, the computer system 201 may be integrated with or as a part of the data collection center housing the network repository 327. In some alternative embodiments, the network repository 327 may be a local repository (not shown) that is connected to the computer system 201.

Method for Filtering Air and Identifying Contaminants

Figure 4:
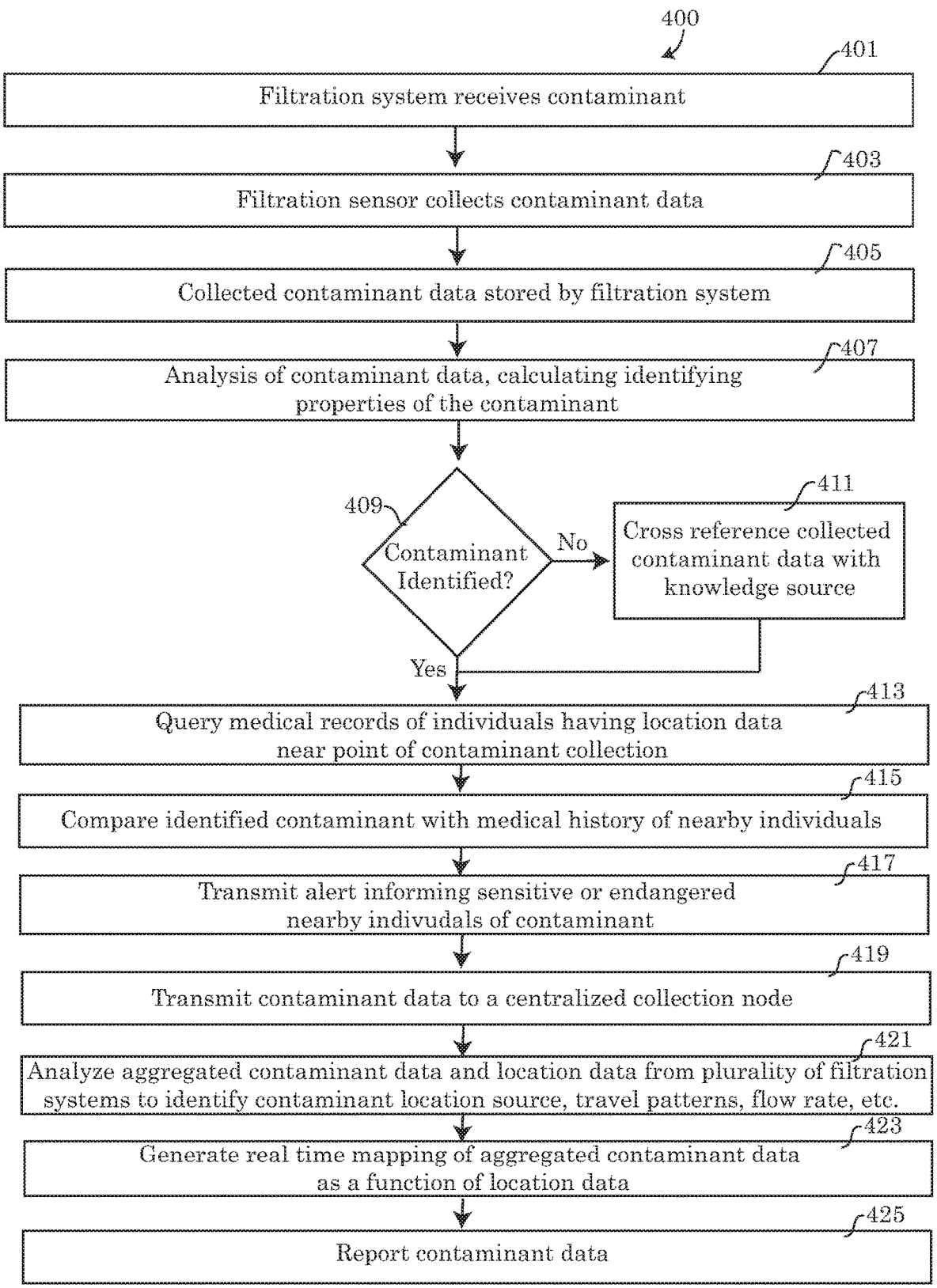
FIG. 4 depicts an embodiment of an algorithm implementing a method for filtering air consistent with the embodiments of the present disclosure.

The drawing of FIG. 4 represents one embodiment 400 of a method or algorithm that may be implemented for filtering air, identifying contaminants being detected and reporting the contaminant in accordance with the filtration systems described in FIGS. 1a-3 using one or more computer systems as defined generically in FIG. 5 below, and more specifically by the specific embodiments of FIG. 1a-3.

Embodiments of a method 400 for filtering air may begin in step 401 whereby an air filtration system receives a contaminant. The contaminant may be entering an air intake or filtering system placed on a residence, factory, warehouse, business or any other building or structure. The contaminant entering the intake may reach the air filter of the filtration system which may prevent the contaminant from passing any further through the building's intake system while still allowing air to travel through.

As a result of the filtration system receiving a contaminant in step 401, the contaminant makes contact with the grid pattern of the air filter which may be coated with a contaminant identifying agent, which may trigger a chemical or physical reaction that may be measureable by an attached filtration sensor. In step 403 of the method 400, the filtration sensor attached to the air filter may receive identifying data about the contaminant as a result of the contact between the contaminant and the grid pattern of the air filter. In the exemplary embodiment, the step of collecting the contaminant data may include priming each segment of the grid pattern of the air filter with a contaminant identifying age, and as the air containing the contaminant is flowing through the air filter, the contaminant in the air may be contacting the contaminant identifying agent of the air filter, triggering an electric charge as a function of the contacting step. The resulting electric charge may be identified by the filtration sensor and recorded as identifying data. In other embodiments the step of collecting identifying contaminant data may collect data corresponding to the type of sensor and identifying agents being used on the air filter. For example, the type of data generated and read by the filtration sensor may vary depending on the method used to collect the identifying data. For instance the collection method and associated sensors may detection as a function of color change chemistry, ion mobility spectrometry, infrared absorption spectroscopy, differential optical absorption spectrometry, aerosol mass spectrometry, Raman spectroscopy, non-dispersive infrared spectroscopy, phosphorus chemiluminescence, light detection and ranging systems (lidar), surface acoustic wave (SAW) technology, electrochemical sensor technology, photoionization technology, photoacoustic infrared spectroscopy, millimeter and submillimeter wave detection, enzymatic antibody immunoassays, aerosol mass spectrometry, and/or one or more chemical agent detection papers known in the art such as M8, M9, M256A1, M256A2, M18A2, M21, M22, M90, ICAD and CAPDS.

The identifying data of the contaminant may be stored in a memory device attached locally or via a remote network to the filtration system. Embodiments of the filtration system may transmit the identifying data of the contaminant collected by the sensors in step 403 and transfer the identifying data to a computer system connected to the sensor either directly or remotely via a network connection. The computer system may be separately attached to the filter housing and/or integrated into the filter housing itself.

In step 403 of the method 400, the filtration system may conduct an analysis of the identifying contaminant data collected in step 403 and stored in step 405 of the method 400. The filtration system may conduct the analysis step 407, using hardware and/or software components of a filtration module, which may include an analytics module and/or a contaminant matching module capable of determining the content of the contaminant received in step 401 based on the identifying contaminant data collected by the filtration sensors. In some embodiments, the analytics module and/or contaminant matching module may be unable to identify the contaminant from the contaminant data collected in step 403 and stored in step 405. The method 400 may perform a check in step 409 to determine whether or not the contaminant has been identified by the contaminant data collected by the filtration sensors.

If the contaminant cannot be identified by the filtration system from the contaminant data collected in step 403 alone, in step 411, the filtration system may cross reference the contaminant data with known contaminant properties stored by a local or network accessible knowledge bases, including database belonging to government agencies, universities and public or private research centers. The analytics module and/or contaminant matching module may compare the properties of the collected contaminant with known contaminants, particulates, matter or molecules in order to predict the known specimen having the properties closest to the identifying data of the contaminant.

In some embodiments of method 400, the filtration system may attempt to track the movements of the contaminant and alert the general public in the proximity of the filtration system of the presence of the contaminant. The general public may include residents, individuals and users who are registered with the profile module of the filtration system, or in alternative embodiments, individuals who may have information publicly accessible to the filtration system. In step 413, the filtration system may perform a query of the medical records of any individuals, users or residents having location data corresponding to a data point near the point of contaminant collection. The medical records may be stored by one or more physicians' offices, hospitals, health clinics, etc. having a medical record system remotely accessible to the filtration system, via a remote connect such as a network connection.

The medical information returned by the query in step 413 may be compared with the identified contaminant in step 415 and analyzed by the analytics module of the filtration systems. The medical information may be analyzed for individuals or patterns of individuals who may exhibit symptoms of exposure to the contaminant, have contracted or been exposed to a disease caused by exposure to the contaminant and/or individuals whose medical information suggests susceptibility, sensitivity or endangerment by being exposed to the contaminant. Subsequently, in step 417, the reporting module of the filtration system may transmit an alert or message to individuals that may be nearby or in the proximity of the contaminant of and dangers or safety precautions that may need to be taken to limit or avoid exposure as well as any symptoms that may appear as a result of exposure. In some embodiments, step 417 may target the transmission of the alert to individuals and users near the filtration system that may be sensitive to or endangered by exposure to the contaminant. In alternative embodiments, the transmission of the alert may be prioritized by the filtration system, whereby the reporting module transmits more specific or more detailed alerts to individuals who may be sensitive to or endangered by contact with the contaminants, and less detailed or less urgent alert to the general public within the proximity to the filtration system.

In some embodiments of method 400, the contaminant data, including the identifying data collected by the filtration sensors, the location data of the air filter and/or sensors and the contaminant's identity may be transmitted in step 419 to a centralized collection node of a network of air filtration systems. The centralized collection node may be one or more computer systems similar to computer system 201 exhibited in the figures. The computing system acting as the centralized collection node may be receiving contaminant identifying data, location data and data confirming the contaminant's identity from a plurality filtration systems or from a plurality computer systems connected to the network. In some embodiments, the centralized collection node may be one of the computing systems of a filtration system designated as a central collection node by the network of filtration systems.

The centralized collection node receiving contaminant identifying data, location data, and confirmed contaminant identities from a plurality of filtration systems may, in step 421, aggregate the received contaminant data and location data, and combine the aggregated data with the contaminant data and location data previously stored in a memory device or network accessible data repository of the centralized collecting node. The centralized collecting node may apply one or more analytical models to the data collected from each of the filtration systems of the network in order to identify patterns of the contaminant. The analysis performed in step 421 may result in the identification of the contaminant's location source, the travel patterns of the contaminant, the rate and direction of the contaminant's flow, and predictive models for the future locations of the contaminant.

Using the predictive analytic models to identify patterns in the aggregated data collected by the plurality of the filtration systems, the centralized collection node may, in step 423, generate a real time and/or live time, updatable mapping of the contaminant data and location data. The generating step may be performed as a function of the collected location data and contaminant identifying data of each filtration system in the filtration network. During the generating step, the centralized collection node may plot the location of each air filtration system contributing to the aggregated data in step 421 to visually demonstrate each location where the contaminant was collected and identified. The centralized collection node may further plot the predicted location of the contaminant source, the travel patterns of the contaminant and regions that are affected by the contaminant. Furthermore, the centralized computing node may use the analytics module to predictively demonstrate and map future locations the contaminant may be traveling to by analyzing the location data, including the dates and times each filtration system of the network received and identified the contaminant, to predict the direction of the contaminant's flow and the contaminant's velocity to predict future filtration system locations that may receive the contaminant.

In step 425, a the reporting module of each filtration system or a reporting module of the centralized collection node, may report the contaminant data to each of the individuals, users, or surrounding general public that may be in the proximity of the contaminant or predicted future proximity of the contaminant. The reporting step 425 may include real time transmission of the mapping created in step 423, wherein the real time mapping may be forwarded to each of the individuals receiving an alert from the filtration system or centralized collection node, including any alerts that may have been transmitted in step 417 described above.

Computer System

Figure 5:
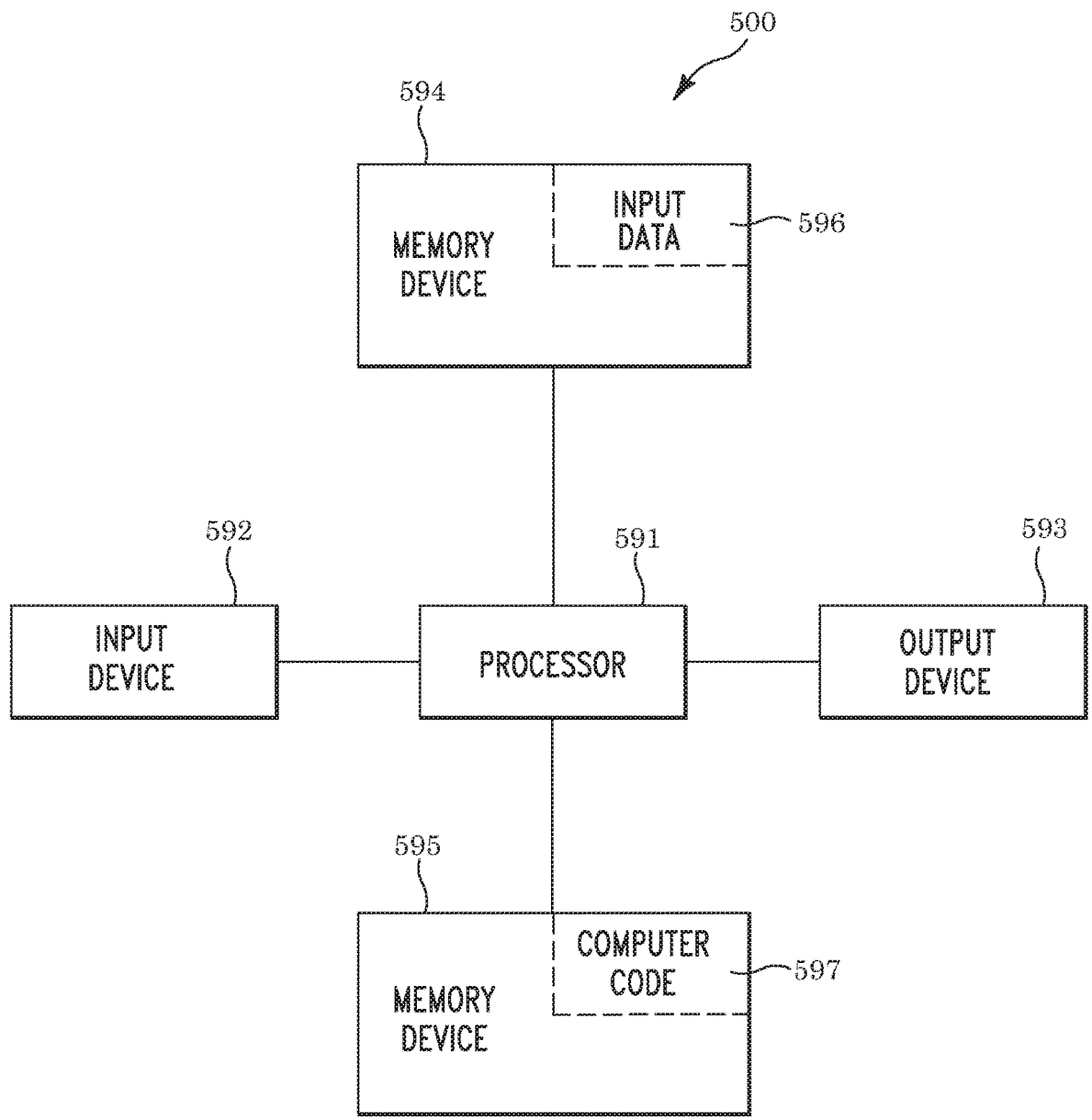
FIG. 5 illustrates a block diagram of an embodiment of a computer system of the air filtration systems, capable of implementing methods for filtering air consistent with embodiments of the present disclosure.

Referring to the drawings, FIG. 5 illustrates a block diagram of a computer system 500 that may be included in the system of FIGS. 1-3 and for implementing the methods of FIG. 4 in accordance with the embodiments of the present disclosure. The computer system 500 may generally comprise a processor 591, an input device 592 coupled to the processor 591, an output device 593 coupled to the processor 591, and memory devices 594 and 595 each coupled to the processor 591. The input device 592, output device 593 and memory devices 594, 595 may each be coupled to the processor 591 via a bus. Processor 591 may perform computations and control the functions of computer 500, including executing instructions included in the computer code 597 for the air filtering tools and programs capable of implementing a method for filtering air and identifying contaminants, in the manner prescribed by the embodiments of FIG. 4 using the systems of FIG. 1a-3, wherein the instructions of the computer code 597 may be executed by processor 591 via memory device 595. The computer code 597 may include software or program instructions that may implement one or more algorithms for implementing the methods of filtering air and identifying contaminants, as described in detail above. The processor 591 executes the computer code 597. Processor 591 may include a single processing unit, or may be distributed across one or more processing units in one or more locations (e.g., on a client and server).

The memory device 594 may include input data 596. The input data 596 includes any inputs required by the computer code 597. The output device 593 displays output from the computer code 597. Either or both memory devices 594 and 595 may be used as a computer usable storage medium (or program storage device) having a computer readable program embodied therein and/or having other data stored therein, wherein the computer readable program comprises the computer code 597. Generally, a computer program product (or, alternatively, an article of manufacture) of the computer system 500 may comprise said computer usable storage medium (or said program storage device).

Memory devices 594, 595 include any known computer readable storage medium, including those described in detail below. In one embodiment, cache memory elements of memory devices 594, 595 may provide temporary storage of at least some program code (e.g., computer code 597) in order to reduce the number of times code must be retrieved from bulk storage while instructions of the computer code 597 are executed. Moreover, similar to processor 591, memory devices 594, 595 may reside at a single physical location, including one or more types of data storage, or be distributed across a plurality of physical systems in various forms. Further, memory devices 594, 595 can include data distributed across, for example, a local area network (LAN) or a wide area network (WAN). Further, memory devices 594, 595 may include an operating system (not shown) and may include other systems not shown in FIG. 5.

In some embodiments, the computer system 500 may further be coupled to an Input/output (I/O) interface and a computer data storage unit. An I/O interface may include any system for exchanging information to or from an input device 592 or output device 593. The input device 592 may be, inter alia, a keyboard, a mouse, etc. or in some embodiments the filtration system 100, air filter 103 or filtration sensor 107. The output device 593 may be, inter alia, a printer, a plotter, a display device (such as a computer screen), a magnetic tape, a removable hard disk, a floppy disk, etc. The memory devices 594 and 595 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus 808 may provide a communication link between each of the components in computer 500, and may include any type of transmission link, including electrical, optical, wireless, etc.

An I/O interface may allow computer system 500 to store information (e.g., data or program instructions such as program code 597) on and retrieve the information from computer data storage unit (not shown). Computer data storage unit includes a known computer-readable storage medium, which is described below. In one embodiment, computer data storage unit may be a non-volatile data storage device, such as a magnetic disk drive (i.e., hard disk drive) or an optical disc drive (e.g., a CD-ROM drive which receives a CD-ROM disk). In other embodiments, the data storage unit may include a knowledge base or data repository as shown in FIGS. 2a, 2b and 3.

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider that offers to deploy or integrate computing infrastructure with respect to filtering air and identifying and reporting the presence of contaminants. Thus, an embodiment of the present invention discloses a process for supporting computer infrastructure, where the process includes providing at least one support service for at least one of integrating, hosting, maintaining and deploying computer-readable code (e.g., program code 597) in a computer system (e.g., computer 500) including one or more processor(s) 591, wherein the processor(s) carry out instructions contained in the computer code 597 causing the computer system to filter air and identify contaminants present in the air. Another embodiment discloses a process for supporting computer infrastructure, where the process includes integrating computer-readable program code into a computer system including a processor.

The step of integrating includes storing the program code in a computer-readable storage device of the computer system through use of the processor. The program code, upon being executed by the processor, implements a method of filtering air and identifying contaminants in the air. Thus the present invention discloses a process for supporting, deploying and/or integrating computer infrastructure, integrating, hosting, maintaining, and deploying computer-readable code into the computer system 500, wherein the code in combination with the computer system 500 is capable of performing a method for filtering air and identifying contaminants in the air.

A computer program product of the present invention comprises one or more computer readable hardware storage devices having computer readable program code stored therein, said program code containing instructions executable by one or more processors of a computer system to implement the methods of the present invention.

A computer program product of the present invention comprises one or more computer readable hardware storage devices having computer readable program code stored therein, said program code containing instructions executable by one or more processors of a computer system to implement the methods of the present invention.

A computer system of the present invention comprises one or more processors, one or more memories, and one or more computer readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method, said method comprising:
   providing an air filtration system comprising an air filter and a filtration sensor, said air filter being coated with a plurality of different contaminant identifying agents at a respective plurality of spatial sections of the air filter; each different contaminant identifying agent configured to cause a change in one or more properties of a different contaminant as a consequence of a reaction between each different contaminant identifying agent and the different contaminant, said change being specific to each combination of contaminant identifying agent and contaminant, said filtration sensor being a device configured to measure the change in the one or more properties of each different contaminant participating in the reaction, said filtration sensor configured to determine, based on the change in the one or more properties, an identity of each different contaminant;
   flowing air containing an airborne contaminant through the air filter, said airborne contaminant in the flowing air reacting with one contaminant identifying agent coated at one spatial section of the air filter, said reacting generating a change in a property of the one contaminant identifying agent;
   said filtration sensor measuring the change in the property of the one contaminant identifying agent resulting from said reacting;
   said filtration sensor identifying an identity of the airborne contaminant due to the change being specific to the combination of the one contaminant identifying agent and the airborne contaminant, and
   reporting, by the air filtration system, the identity of the airborne contaminant.

2. The method of claim 1, wherein a database comprises medical information of one or more individuals located in a proximity of the air filtration system, said method further comprising:
   alerting each individual, of the one or more individuals, who are identified as being sensitive to, or endangered by, the airborne contaminant, based on the medical information in the database in consideration of the reported identity of the airborne contaminant.

3. The method of claim 1, said reacting comprising generating an electrical change in the one contaminant identifying agent, said electrical change being an electric charge.

4. The method of claim 1, wherein the one contaminant is selected from the group consisting of dust, pollen, algae, bacteria, viruses, mold, mildew, dander, solvents, foreign molecules, and radioactive particles.

5. The method of claim 1, wherein the property of the one contaminant identifying agent is selected from the group consisting of color, absorption of electromagnetic energy, scattering of electromagnetic energy, chemiluminescence, physical separation, electrochemical interaction, enzymatic reactions, temperature, thermal conductivity, and chemical concentration.

6. The method of claim 1, wherein said filtration sensor identifying the identity of the airborne contaminant comprises:
said filtration sensor sending, via a data bus, the measured change in the property of the one contaminant identifying agent to a filtering module of the air filtration system, and in response, said filtration sensor receiving, from the air filtration system, the identity of the one airborne contaminant based on a comparison, by the air filtration system, between the one airborne contaminant and identifying features of known contaminants stored in a knowledge base.

7. The method of claim 1, wherein said filtration sensor identifying the identity of the airborne contaminant comprises:
said filtration sensor utilizing a technology to identify the airborne contaminant based on the measured change in the property of the one contaminant identifying agent, said technology selected from the group consisting of color change chemistry, ion mobility spectrometry, infrared absorption spectroscopy, differential optical absorption spectrometry, aerosol mass spectrometry, Raman spectroscopy, non-dispersive infrared spectroscopy, phosphorus chemiluminescence, light detection and ranging systems (lidar), surface acoustic wave (SAW) technology, electrochemical sensor technology, photoionization technology, photoacoustic infrared spectroscopy, millimeter and submillimeter wave detection, enzymatic antibody immunoassays, and aerosol mass spectrometry.

8. The method of claim 1, said reporting the identity of the airborne contaminant comprising:
sending the identity of the airborne contaminant to at least one entity selected from the group consisting of physicians, hospitals, clinics, residents located in a proximity of the air filtration system, users registered with the air filtration system, government agencies, research facilities, and combinations thereof.

9. The method of claim 8, said method further comprising:
aggregating, by the air filtration system, location data received from a plurality of air filtration systems each air filtration system reporting the identity of the airborne contaminant;
generating, by the air filtration system, a real time map comprising the location data from each air filtration system of the plurality of air filtration systems;
identifying, by the air filtration system, a location on the real time map indicating the source of the airborne contaminant; and
reporting, by the air filtration system to the at least one entity, the source of the airborne contaminant.

* * * * *